(12) United States Patent
Wirth et al.

(10) Patent No.: US 7,077,609 B2
(45) Date of Patent: Jul. 18, 2006

(54) BLIND RIVET, RIVET PIN, HOLDING DEVICE, METHOD FOR PRODUCING A BLIND RIVET AND METHOD FOR CREATING A RIVETED JOINT

(75) Inventors: Klaus Wirth, Landsberg (DE); Martin Wirth, Landsberg (DE)

(73) Assignee: Adolf Wuerth GmbH & Co. KG, Kuenzelsau (DE)

( * ) Notice: Subject to any disclaimer, the term of this patent is extended or adjusted under 35 U.S.C. 154(b) by 0 days.

(21) Appl. No.: 10/239,323

(22) PCT Filed: Mar. 28, 2001

(86) PCT No.: PCT/EP01/03533

§ 371 (c)(1),
(2), (4) Date: Jan. 30, 2003

(87) PCT Pub. No.: WO01/73303

PCT Pub. Date: Oct. 4, 2001

(65) Prior Publication Data

US 2004/0047704 A1    Mar. 11, 2004

(30) Foreign Application Priority Data

Mar. 29, 2000  (DE) ................... 100 15 447
Aug. 24, 2000  (DE) ................... 100 41 550

(51) Int. Cl.
*F16B 13/04*     (2006.01)
(52) U.S. Cl. ........................... 411/43; 411/501
(58) Field of Classification Search ............ 411/43, 411/70, 501, 39, 504
See application file for complete search history.

(56) References Cited

U.S. PATENT DOCUMENTS

| 4,170,920 | A | * | 10/1979 | Siebol ................ 411/43 |
| 4,293,258 | A |   | 10/1981 | McKewan |
| 4,836,728 | A | * | 6/1989  | Mauer et al. .......... 411/43 |
| 4,910,992 | A | * | 3/1990  | Stenberg et al. ....... 29/798 |
| 5,344,267 | A | * | 9/1994  | Stenberg et al. ....... 411/29 |
| 6,042,313 | A | * | 3/2000  | Dehlke ............... 411/43 |

FOREIGN PATENT DOCUMENTS

| EP | 142960 | 5/1985 |
| EP | 578275 | 1/1994 |
| EP | 894986 | 2/1999 |

* cited by examiner

*Primary Examiner*—William L. Miller
(74) *Attorney, Agent, or Firm*—Orum & Roth LLC

(57) ABSTRACT

The invention relates to a blind rivet, a rivet pin, a holding device, a method for producing a blind rivet and a method for creating a riveted joint which enables a permanent joint to be produced between several workpieces in one working cycle.

18 Claims, 4 Drawing Sheets

BLIND RIVET, RIVET PIN, HOLDING DEVICE, METHOD FOR PRODUCING A BLIND RIVET AND METHOD FOR CREATING A RIVETED JOINT

BACKGROUND OF THE INVENTION

1. Field of the Invention

The invention involves a blind rivet, a rivet mandrel, a mounting device, a process for manufacturing a blind rivet and a process for making a riveted joint.

2. Description of Related Art

A blind rivet (open-end blind rivet, closed-end blind rivet) is used to create an inseparable connection between several workpieces, whereby in order to set the rivet, only one side of the workpiece must be accessible. Usually, before the blind rivet is inserted, a hole must be pre-drilled. This practice, however, requires an additional work step and in addition, is time-consuming.

In order to minimize this time expense, an open-end blind rivet is provided with a tip that allows it to penetrate through the workpiece and anchor the blind rivet in a work operation using a device. It is disadvantageous in this process that only relatively thin-walled and soft plate materials can be penetrated. This is, on the one hand, based on the blind rivet manufacturing process, in which the tip of a blind rivet is usually created by massive forming (molding). This process, however, does not lead to sharp edges, but instead to rounded off edges of the tips, which thus only push through the workpieces, but can not cut through them. On the other hand, the material used, for example, is not able to handle the impact forces necessary for the penetration of harder and/or thicker materials.

SUMMARY OF THE INVENTION

The blind rivet according to the invention has the advantage that within one work step, a penetration through the workpieces and a subsequent anchoring of the blind rivet occurs. For this purpose, in the blind rivet according to the invention, the rivet shaft is constructed in a cup-shape (closed-end blind rivet) and the end of the rivet shaft away from the the rivet head-side is constructed as a tip and/or with a sharp edge. In this way, the penetration of the workpieces is made easier and also, it is possible to bore through harder and thicker materials.

According to an advantageous embodiment of the invention, the tip is ground to form a sharp edge.

According to another advantageous embodiment of the invention, the tip is cut to form a sharp edge.

According to another advantageous embodiment of the invention, the tip is cut to form a sharp edge and then ground after that.

According to another advantageous embodiment of the invention, the tip has an angle between 10° and 70°.

According to another advantageous embodiment of the invention, the tip has a cross-section that is at least triangular, a partition wall, a dagger shape, or the like. In this way, the cut edges end in one or more points on the outer end of the end of the mandrel.

According to another advantageous embodiment of the invention, the rivet head collar of the blind rivet has an undercut on the side that faces the workpiece.

According to another advantageous embodiment of the invention, the rivet head collar of the blind rivet is in the shape of a sphere. In the use of mounting devices in shooting devices or the like, the requirements of the mounting device and thus the material wear is reduced by these rounded-off areas.

According to another advantageous embodiment of the invention, the rivet head collar of the blind rivet is provided with a sealing element. In this way, the joint of the workpieces riveted with the blind rivet is impermeable to liquid and gas.

According to another advantageous embodiment of the invention, the degree of hardness of the rivet mandrel is at least 600 N/mm$^2$. In this way, a deformation of the rivet mandrel by the impact is prevented.

The rivet mandrel of a blind rivet according to another embodiment of the invention has the advantage that, as in the key-lock principle, the free mandrel end (11) of the rivet mandrel (2) is shaped in a radially form-fit manner with the tool used to set the blind rivet (shooting device, blind rivet setting device, or the like). By the special design of the end of the mandrel, an interaction between the blind rivet and the special tool required to set the blind rivet is ensured. In this way, the insertion forces act in the direction and along the rivet mandrel axis.

According to an advantageous embodiment of the invention, the free mandrel end is constructed as a centrally symmetrical elevation or recess (cone, spherical segment, pyramid, spherical cap, indentation, or the like). In this way, a force acting on the mandrel end is at least partially guided further in the direction of the rivet mandrel center axis.

According to another advantageous embodiment of the invention, the rivet mandrel is tapered towards the mandrel end or constructed so that it expands.

The mounting device according to another embodiment of the invention, of a tool (shooting device, blind rivet setting device, or the like) for the fixing of a blind rivet, the advantage that the through-put opening of the mounting device has a ring, or the like, through the opening of which the blind rivet can be received.

According to an advantageous embodiment, the ring integrated in the mounting device is manufactured mostly out of rubber, or the like, and can thus be flexibly fit to different blind rivets, in order to prevent them from falling out, for example, from out of the shooting device.

The process according to the invention for manufacturing a blind rivet, provides for a sharpening of the rivet mandrel or the rivet shaft. This sharpening is done after or during the process steps customary in the course of machine manufacturing (e.g. cutting into lengths, pre-clenching, putting together of the individual parts) by cutting and/or grinding.

The process according to the invention for making a riveted joint, in particular using a device suitable for this purpose (shooting device, blind rivet setting device, or the like), provides that the forces of the tool (shooting device, blind rivet setting device, or the like) acting in the setting direction on the rivet mandrel, which cause the workpiece to be bored through until the stopper, are guided at least partially in the direction and along the rivet mandrel center axis. By this transfer of forces, even harder workpieces can also be bored through.

According to an advantageous embodiment of the process according to the invention, a pin transfers a force acting by an impact or striking on the rivet mandrel, which makes it possible to the go through workpiece.

According to a related embodiment of the process according to the invention, the pin is tapered on the side that faces the rivet mandrel, provided with an indentation (spherical cap) and/or another construction functioning for the purpose of centering.

According to another advantageous embodiment of the process according to the invention, the device (shooting device, blind rivet setting device) for fixing the rivet head has a mounting device with a ring made of rubber or the like. By fixed clamping of rivet head using the ring, a falling out of the blind rivet out of the device is prevented.

According to another advantageous embodiment of the process according to the invention, the boring of the workpiece is done as a cut. This cutting makes easier the penetration of the workpieces.

Additional advantages and advantageous embodiments of the invention can be ascertained from the following description, the drawing and the claims.

BRIEF DESCRIPTION OF THE FIGURES

Embodiment examples of the object of the invention are described in greater detail in the following. Shown are.

DETAILED DESCRIPTION OF THE INVENTION

Figure 1:
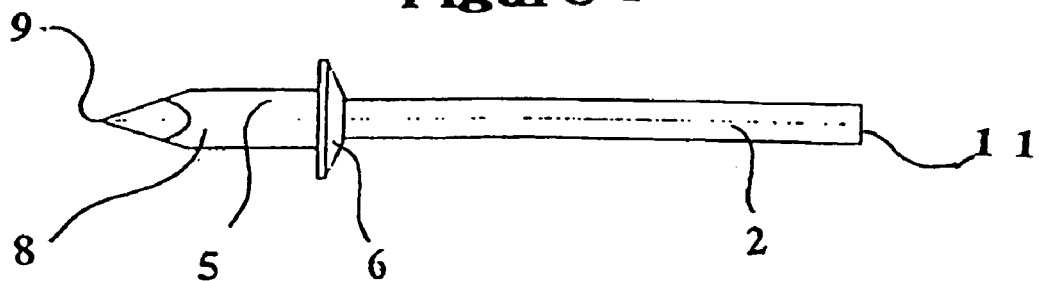
FIG. 1 a side view of a closed-end blind rivet with tip.

The blind rivet shown in FIG. 1 is a closed-end blind rivet and essentially consists of a rivet mandrel 2 and a closed-end rivet shaft 5. The rivet shaft 5 is subdivided into the rivet head 6 and a closing head 8. The end of the rivet shaft 5 away from the rivet head is shaped into a tip 9. This tip makes it possible for the workpieces to be penetrated without the necessity for a pre-drilling. By a subsequent pull of the rivet mandrel 2 in the direction opposite the impact direction, the rivet shaft 5 and the closing head 8 become deformed resulting in a joining of the workpieces.

Figure 2:
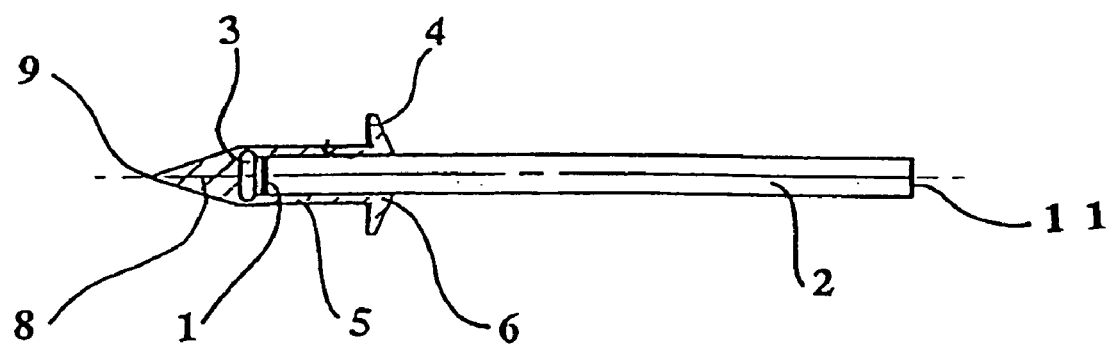
FIG. 2 a section view of the closed-end blind rivet with tip from FIG. 1, FIG. 3 a three-dimensional view of the closed-end blind rivet with tip from FIG. 1, FIG. 4 a side view of a closed-end blind rivet with tip and sealing ring, FIG. 5 a section view of the closed-end blind rivet with tip and sealing ring from FIG. 4, FIG. 6 a three-dimensional view of the closed-end blind rivet with tip and sealing ring from FIG. 4, FIG. 7 a side view of an open-end blind rivet with sharpened rivet mandrel, FIG. 8 a section view of the open-end blind rivet with sharpened rivet mandrel from FIG. 7, FIG. 9 a side view of an open-end blind rivet with sharpened rivet mandrel and with an indented mandrel end and, FIG. 10 a section view of an open-end blind rivet, which is fixed in a mounting device of a shooting device (not shown).

This deformation is brought about in a closed-end blind rivet through the rod head 3 shown in FIG. 2, which is pulled in the direction of the rivet head 6 in order to anchor the closed-end blind rivet. The riveted joint is thus made on the one side of the workpieces to be joined by the deformation of the rivet shaft 5 and the closing head 8 and on the other side of the workpieces by the rivet head 6, whose edge has a rivet head collar 4. After the joint has been made, the target breaking point 1 makes possible a separation of the rivet mandrel 2.

Figure 3:
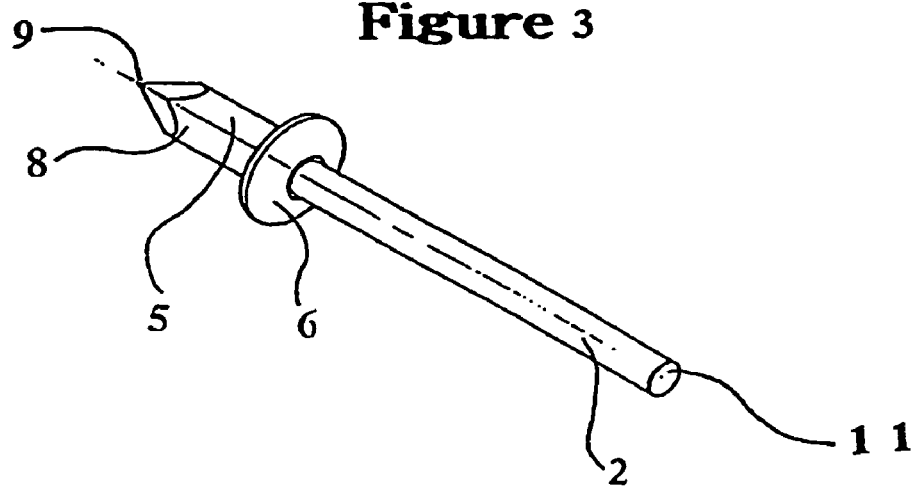

In FIG. 3, a three-dimensional diagram of the closed-end blind rivet is shown. In this diagram, the free end of the rivet mandrel 2 is depicted clearly as a mushroom head. Depending on the special tool used (shooting device, blind rivet setting device, or the like), however, in order to achieve an optimal form-fit, other shapes (pyramid, cone, indentation, or the like) of the mandrel end 11 are possible.

Figure 4:
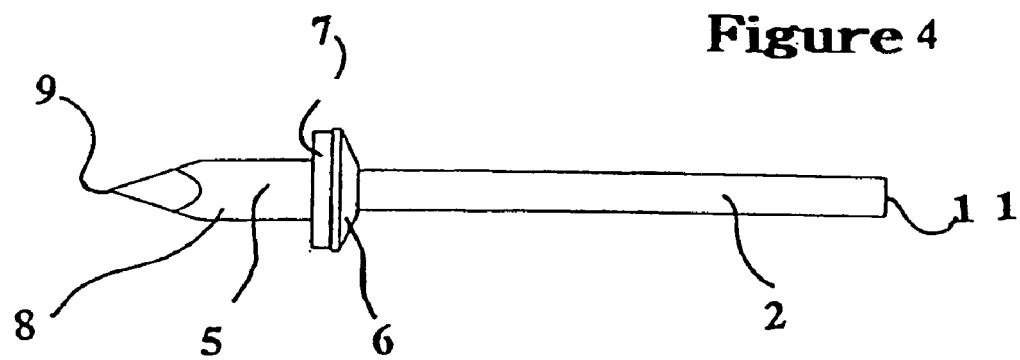
Figure 5:
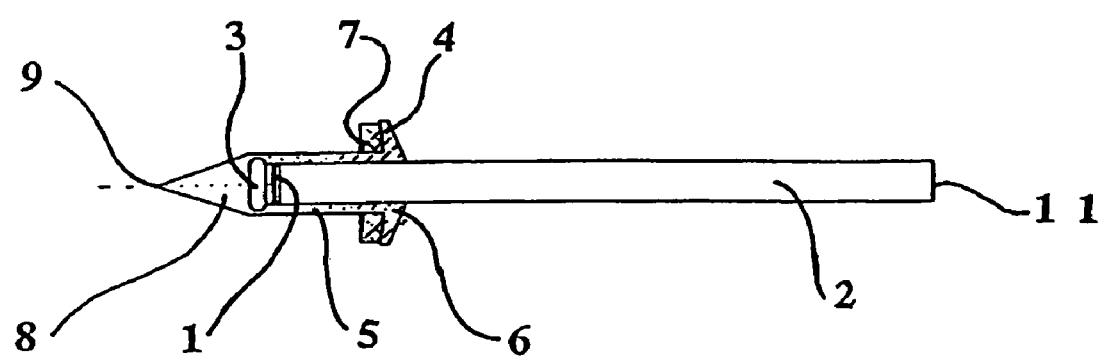
Figure 6:
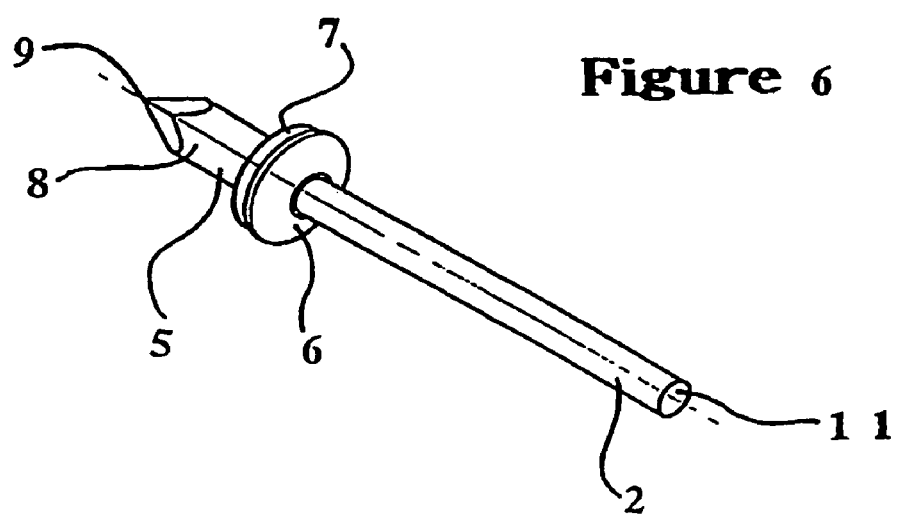

The embodiment example of a closed-end blind rivet shown in FIGS. 4, 5 and 6 is distinguished from the embodiment example shown in FIGS. 1, 2 and 3 by the sealing element 7, which after the connection, lies flush between the workpiece and the rivet head 6 and thus causes a liquid and gas impermeable seal.

Figure 7:
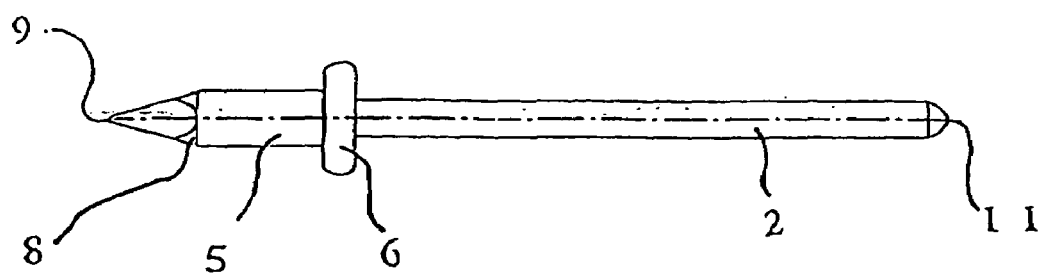

The blind rivet shown in FIG. 7 is an open-end blind rivet and consists essentially of a rivet mandrel 2 and a rivet tube. In this case, the rivet mandrel 2 is shaped into a tip 9. This tip 9 makes possible the penetration of the workpieces without a pre-drilling being necessary. By a subsequent pull of the rivet mandrel 2 in the direction opposite the impact direction, the rivet shaft 5 and the closing head 8 are deformed resulting in a riveted joint of the workpieces. The mandrel end 11 has a rounded-off shape. However, in order to obtain an optimal fit to the tool used for processing (shooting device, blind rivet setting device, or the like), other shapes (pyramid, cone, indentation, or the like) of the end of the mandrel 11 are possible.

Figure 8:
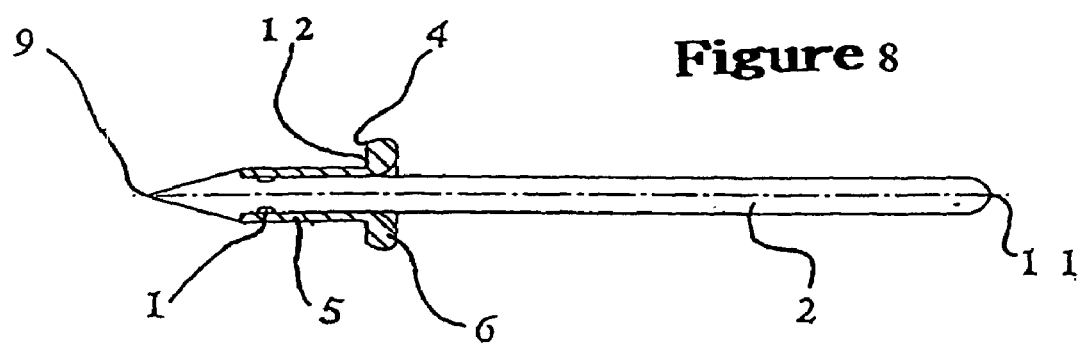

The undercut 12 shown in FIG. 8 functions for the better support of the processed blind rivet on the workpiece. This undercut is also conceivable on closed-end blind rivets.

Figure 9:
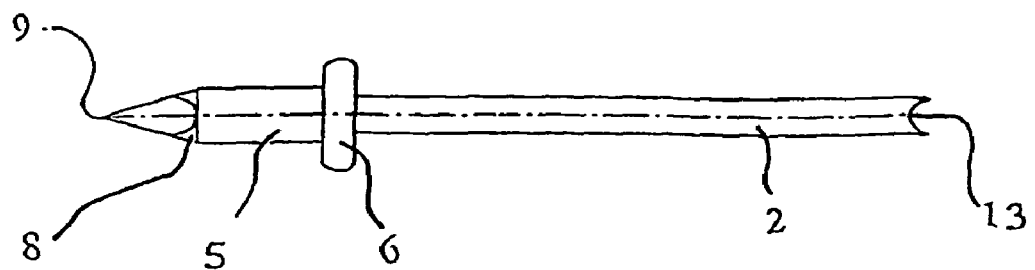

The mandrel end 11 shown in FIG. 9 is indented in the shape of a spherical cap. However, other indentations 13 of the mandrel end 11 are also possible. By this design, the force of the pin is centered and guided into the rivet mandrel interior when the pin hits or strikes the end of the mandrel 11.

Figure 10:
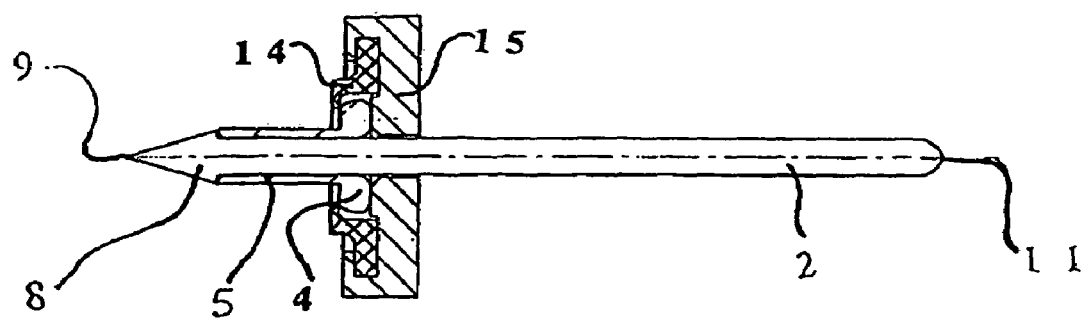

FIG. 10 shows a section view of an open-end blind rivet, which is fixed in a mounting device of a shooting device (not shown). The spherical, rounded-off shape of the rivet head collar 4, which makes it possible for the opening of the flexible ring 14 preferably made out of rubber to fit, in order to become clamped fixed behind so that the blind rivet is secured against falling out, is advantageous. By the rounded-off shape of the rivet head collar 4, the wear on the ring 14 is minimized. The spherical, rounded-off shape of the rivet head collar 4 is also conceivable on a closed-end blind rivet. In order to fix the blind rivet in the mounting device, other embodiments are also conceivable, in addition to the ring 14 that forms the opening, possibly even several structural parts.

All of the characteristics depicted in the description, the following claims, and the drawings can be essential to the invention both individually as well as in any desired combination with each other.

REFERENCE NUMBER LIST

1 Target breaking point
2 Rivet mandrel
3 Rod head
4 Rivet head collar
5 Rivet shaft
6 Rivet head
7 Sealing element
8 Closing head
9 Tip
11 Mandrel end
12 Undercut
13 Indentation
14 Ring
15 Part of the shooting device

The invention claimed is:

1. Blind rivet for joining workpieces, comprising
a rivet mandrel that has a target breaking point and a mandrel end,
a rivet shaft arranged coaxially to the rivet mandrel, said rivet shaft including a rivet head and a closing head,
a rod head located on the rivet mandrel on the target breaking point side and
a rivet head collar arranged on the rivet shaft adapted to be set on a workpiece,
wherein
the end of the rivet shaft opposite the rivet head comprises a tip, the tip is a unitary one-piece structure with the rivet shaft and the tip comprises a plurality of planar surfaces, said planar surfaces intersecting at a sharp cutting edge,
wherein the tip and the cutting edge are formed of the same material, the tip has cutting properties and the cutting edge is adapted to cut the workpiece when a force is applied in the direction of the mandrel center axis.

2. Blind rivet according to claim 1, wherein the tip is ground so that it has a sharp edge.

3. Blind rivet according to claim 1, wherein the tip is cut so that it has a sharp edge.

4. Blind rivet according to claim 1, wherein the tip is cut so that it has a sharp edge and after that it is ground.

5. Blind rivet according to claim 1, wherein the edges of the tip have an angle between 10° and 70°.

6. The blind rivet of claim 5 wherein the tip is free of a separate cutting material.

7. Blind rivet according to claim 1, wherein the edges of the tip have a cross-section that is triangular, a partition wall, or a dagger shape.

8. Blind rivet according to claim 1, wherein the rivet head collar has an undercut on the side facing the workpiece.

9. Blind rivet according to claim 1, wherein the rivet head collar is formed in the shape of a sphere.

10. Blind rivet according to claim 1, further comprising a sealing element applied on the workpiece-side part of the rivet head.

11. Blind rivet according to claim 1, wherein the degree of hardness of the rivet mandrel is at least 600 N/mm$^2$.

12. Blind rivet according to claim 1, wherein
the mandrel end of the rivet mandrel is shaped in a radial form-fit manner with a tool used to set the blind rivet and
the setting forces act in the direction and along the rivet mandrel axis.

13. Blind rivet according to claim 12, wherein the mandrel end is constructed as a centrally symmetric elevation or recess.

14. The blind rivet of claim 13 wherein the centrally symmetrical elevation or recess is a cone, spherical segment, pyramid, spherical cap, mushroom head or indentation.

15. Blind rivet according to claim 12, wherein the rivet mandrel is shaped such that it tapers or expands towards the mandrel end.

16. The blind rivet of claim 12 wherein the tool is a shooting device or blind rivet setting device.

17. The blind rivet of claim 12 wherein the tip is free of a separate cutting material.

18. The blind rivet of claim 1 wherein the tip is free of a separate cutting material.

* * * * *